(12) United States Patent
Choi (10) Patent No.: US 7,431,128 B2
(45) Date of Patent: Oct. 7, 2008

(54) NOISE ABSORBING STRUCTURE OF INSTRUMENT PANEL

(75) Inventor: Jae-Seob Choi, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 11/228,221

(22) Filed: Sep. 19, 2005

(65) Prior Publication Data

US 2006/0131100 A1 Jun. 22, 2006

(30) Foreign Application Priority Data

Dec. 17, 2004 (KR) .................. 10-2004-0108124

(51) Int. Cl.
*G10K 11/16* (2006.01)
(52) U.S. Cl. .................. 181/296; 181/204; 181/210; 181/205; 181/294; 181/286; 181/290
(58) Field of Classification Search ............... 181/204, 181/210, 205, 294, 286, 290, 296; 180/69.22, 180/69.23, 90; 296/39.3, 39.1
See application file for complete search history.

(56) References Cited

U.S. PATENT DOCUMENTS

| 4,060,142 | A * | 11/1977 | Abe ..................... 180/68.1 |
| 4,851,271 | A * | 7/1989 | Moore et al. ............. 428/34.5 |
| 7,080,712 | B2 * | 7/2006 | Tsuiki et al. ............... 181/204 |
| 2004/0055813 | A1* | 3/2004 | Tsuiki et al. ............... 181/204 |
| 2004/0238275 | A1* | 12/2004 | Keller et al. ............... 181/286 |
| 2005/0150720 | A1* | 7/2005 | Tudor et al. ............... 181/286 |

FOREIGN PATENT DOCUMENTS

| JP | 2000-071902 | 3/1970 | |
| JP | 404303077 A * | 3/1991 | ............. 296/39.3 |
| JP | 11-034761 | 2/1999 | |
| JP | 11-078981 | 3/1999 | |
| JP | 2002-220009 | 8/2002 | |
| JP | 2003-072593 | 3/2003 | |
| JP | 2004-168133 | 6/2004 | |

OTHER PUBLICATIONS

English Language Abstract of JP 11-078981, Mar. 23, 1999.
English Language Abstract of JP 11-034761, Feb. 9, 1999.
English Language Abstract of JP 2000-071902, Mar. 7, 2000.
English Language Abstract of JP 2002-220009, Aug. 6, 2002.
English Language Abstract of JP 2003-072593, Mar. 12, 2003.
English Language Abstract of JP 2004-168133, Jun. 17, 2004.

* cited by examiner

*Primary Examiner*—Walter Benson
*Assistant Examiner*—Forrest Phillips
(74) *Attorney, Agent, or Firm*—Greenblum & Bernstein, P.L.C.

(57) ABSTRACT

A noise absorbing structure of an instrument panel of a vehicle includes a first noise absorbing panel, provided in the instrument panel disposed in front of a driver seat of the vehicle, a second noise absorbing panel, provided in the instrument panel disposed in front of a front passenger seat of the vehicle, and a third noise absorbing panel, provided in the instrument panel that is disposed in front of a moisture removing ventilation port.

11 Claims, 6 Drawing Sheets

NOISE ABSORBING STRUCTURE OF INSTRUMENT PANEL

RELATED APPLICATIONS

The present disclosure relates to subject matter contained in Korea Application No.10-2004-0108124, filed on Dec. 17, 2004, which is herein expressly incorporated by reference its entirety.

BACKGROUND OF THE INVENTION

1. Field of the Invention

The present invention relates to a noise absorbing structure of a vehicle instrument panel, and more particularly, to a noise absorbing structure of a vehicle instrument panel in which the vehicle instrument panel vibrates to prevent noise due to vibration generated in and out of the vehicle from being transmitted to the interior of the vehicle.

2. Description of the Related Art

Generally, a vehicle interior module includes various meters disposed in front of a driver seat, a centerpiece housing audio equipment and air conditioner operating switches, and a glove box disposed in front of a passenger seat. The meters, the centerpiece, and the glove box are disposed at the lower side of the instrument panel.

Moreover, an engine for supplying driving force to the vehicle is installed in the front body of the vehicle. Since a vehicle, in which noise and vibration generated by the engine are spread outside the vehicle or transmitted to the passenger compartment of the vehicle, is estimated as low quality vehicle, this low quality vehicle is difficult to survive in the competition in vehicle markets.

Thus, recently, with a lot of time and at a great coat, the majority of vehicle manufacturers are engaged in efforts to develop technologies for reducing engine vibration such that the vibration is prevented from being transmitted to the passenger compartment and the outside of the vehicle.

As a result, the technologies for intercepting the transmission of vibration and noise to the vehicle interior and for preventing vibration and noise from being transmitted to the outside of the vehicle are considerably developed. However, since the technologies for intercepting the transmission of vibration and noise to the vehicle interior have yet to be adequately realize vibration is generated from the instrument panel of a vehicle and noise is transmitted to the vehicle interior via the instrument panel.

SUMMARY OF THE INVENTION

Therefore, the present invention has been made in view of the above and/or other problems, and it is an object of the present invention to provide a noise absorbing structure of a vehicle instrument panel for preventing an instrument panel from vibrating due to vibration generated by an engine and for damping noise generated outside and transmitted to the vehicle interior.

In accordance with the present invention, the above and other aspects can be accomplished by the provision of a noise absorbing structure of an instrument panel of a vehicle including a first noise absorbing panel, provided in the instrument panel disposed in front of a driver seat of the vehicle, for damping noise and vibration, a second noise absorbing panel, provided in the instrument panel disposed in front of a front passenger seat of the vehicle, for damping noise and vibration, and a third noise absorbing panel, provided in the instrument panel that is disposed in front of a moisture removing ventilation port for discharging air to remove moisture from a front window of the vehicle, for damping noise and vibration.

Preferably, the first noise absorbing panel damps vibration and noise generated by the instrument panel in front of the driver seat, the second noise absorbing panel damps vibration and noise generated by the instrument panel in front of the front passenger seat, and the third noise absorbing panel damps vibration and noise generated by the instrument panel where the moisture removing ventilation port is disposed. The first, second, and third noise absorbing panels are attached to the lower surface of the instrument panel such that they are not exposed to the instrument panel and are attached to the instrument panel before the assembly of the instrument panel.

Since the first, second, and third noise absorbing panels are attached to various positions of the upper side of the instrument panel, noise, by vibration of the upper side of the instrument panel due to an engine, road conditions, and vehicle windows when traveling, is prevented. Particularly, the third noise absorbing panel damps vibration and noise generated when air is discharged through the moisture removing ventilation port Moreover, the noise absorbing panels are attached to the lower surface of the instrument panel by an ultrasonic welding device. The first, second, and third noise absorbing panels are attached to the lower surface of the instrument panel before the instrument panel is installed in a vehicle, and the ultrasonic welding device serves to as an attaching device.

The ultrasonic welding device melts and bonds different materials using friction, and is well suited to use as an attaching device for attaching the instrument panel and the noise absorbing panels, made of nonconductive materials such as plastic.

Further, the noise absorbing panels are attached to the lower surface of the instrument panel by a hot melt spraying device. Here, the hot melt spraying device attaches the first noise absorbing panel to the instrument panel by melting thermoplastic resins and coating the melted thermoplastic on the bonding surface of the first noise absorbing panel. The hot melt spraying device simply attaches the noise absorbing panels to the instrument panel and can be applied to attach the noise absorbing panels to the instrument panel of a vehicle that is already manufactured.

The noise absorbing panels exhibit excellent noise absorbing performance and are mainly used as noise absorbing materials applied to the outside and inside of the vehicle. The noise absorbing panels comprise non-woven fabrics manufactured by fixing polypropylene micro fabric to polyester fabric. These noise absorbing panels are conveniently attached by the ultrasonic welding device.

The noise absorbing panels are non-woven fabrics that are obtained by making cotton, polyester segments, and fabric, generated in clothe factories or fabric factories, into short fibers, mixing and accumulating thermoplastic fabric with low melting point, and heating and cooling the mixed and accumulated thermoplastic fabrics. Since the noise absorbing panels are made of the composition of natural fabric and chemical fabric, the noise absorbing panels exhibit excellent heat retention, moisture proof, low temperature resistance, and environment resistance. Since the noise absorbing panels are made of recycled fabrics, they have a strong competitive power in price. Since the noise absorbing panels suck minute fabrics under a high vacuum condition, fear of odor and dust is solved. Moreover, since natural fabric and thermoplastic fabric are applied to the noise absorbing panels, the noise absorbing panels are environmentally friendly.

BRIEF DESCRIPTION OF THE DRAWINGS

These and/or other aspects and advantages of the present invention will become apparent and more readily appreciated from the following description of the embodiments, taken in conjunction with the accompanying drawings, in which.

DESCRIPTION OF THE PREFERRED EMBODIMENTS

Hereinafter, the preferred embodiment of the present invention will be described in detail with reference to the accompanying drawings.

The preferred embodiment of the present does not restrict scope of the present invention, but will be disclosed for illustrative purpose and various modifications, additions and substitutions are possible.

Figure 1:
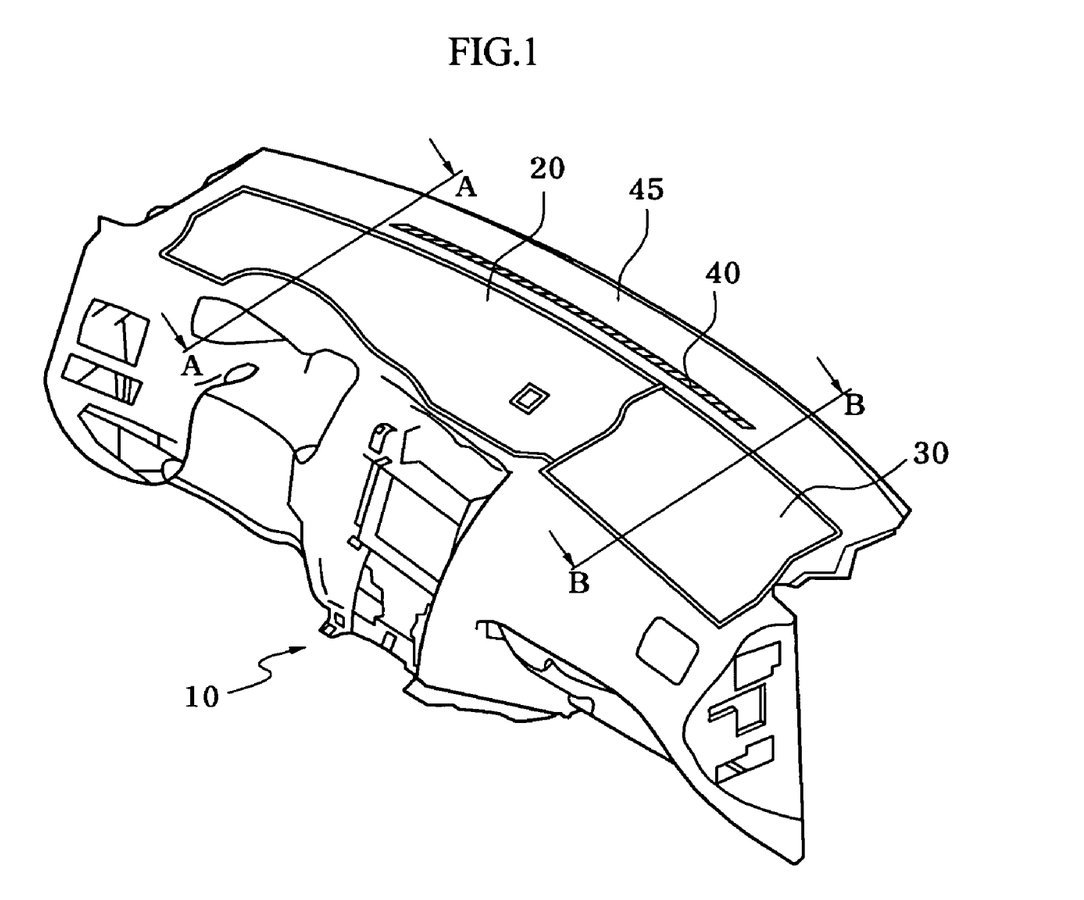
FIG. 1 is a perspective view illustrating a noise absorbing structure of an instrument panel according to a preferred embodiment of the present invention.
Figure 2:
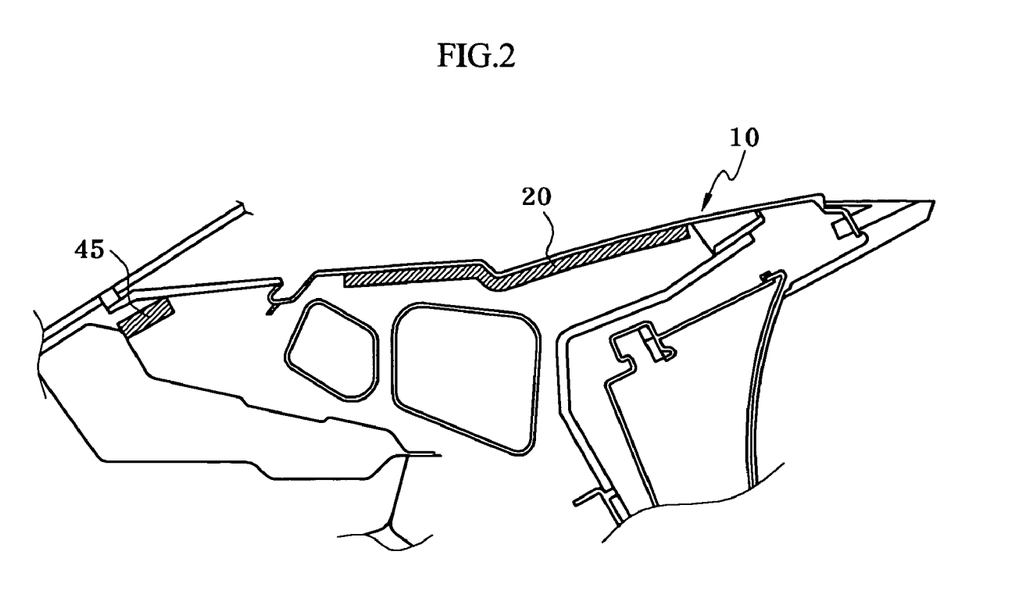
FIG. 2 is a sectional view of the noise absorbing structure of an instrument panel taken along the line A-A' in FIG. 1.
Figure 3:
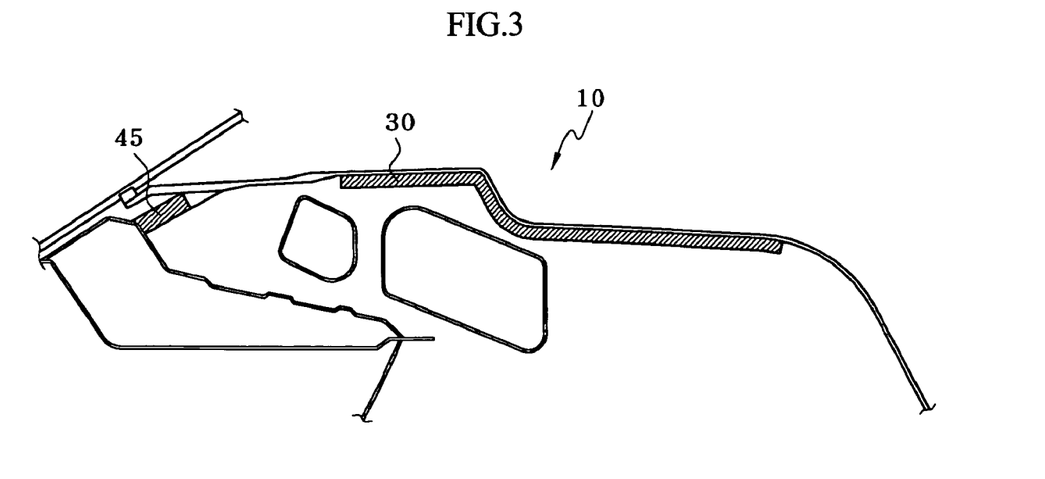
FIG. 3 is a sectional view of the noise absorbing structure of an instrument panel taken along the line B-B' in FIG. 1.
Figure 4:
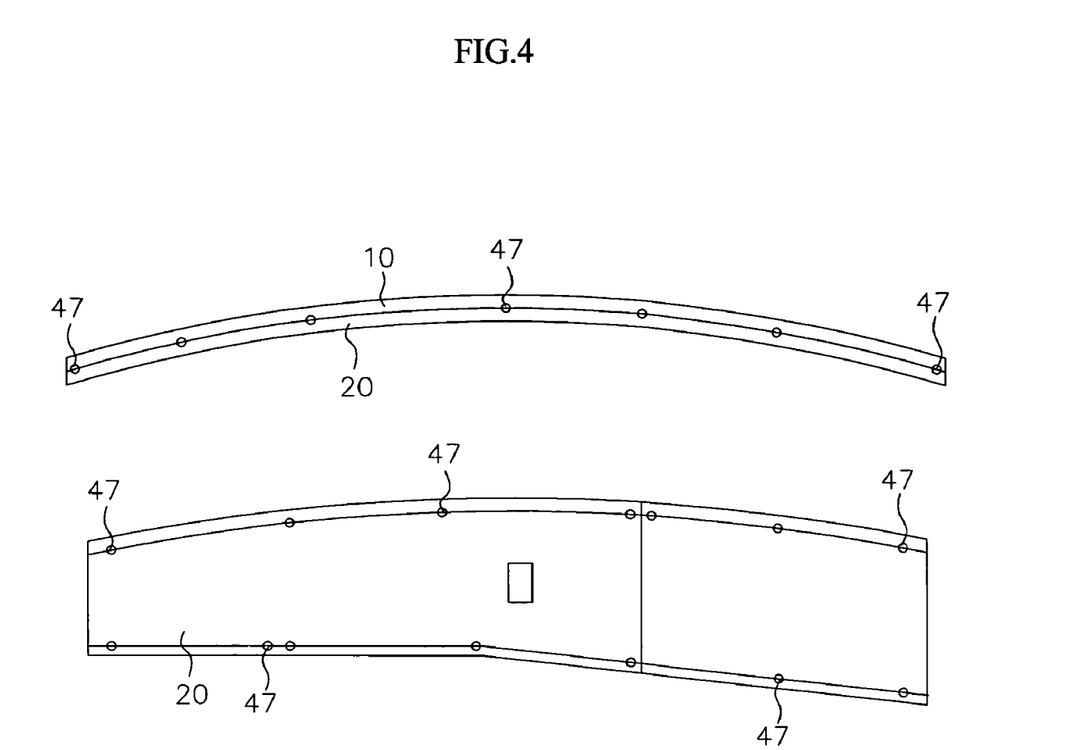
FIG. 4 is a view illustrating ultrasonic welding points on the noise absorbing structure of an instrument panel according to the preferred embodiment of the present invention.
Figure 5:
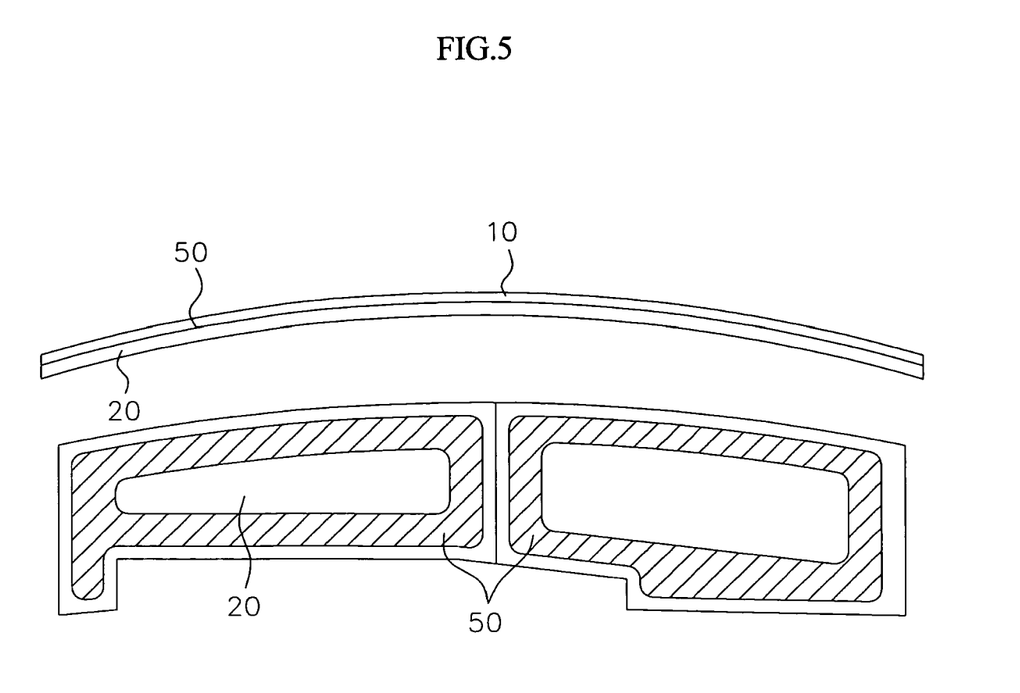
FIG. 5 is a view illustrating a hot melt spraying line on the noise absorbing structure of an instrument panel according to the preferred embodiment of the present invention.
Figure 6:
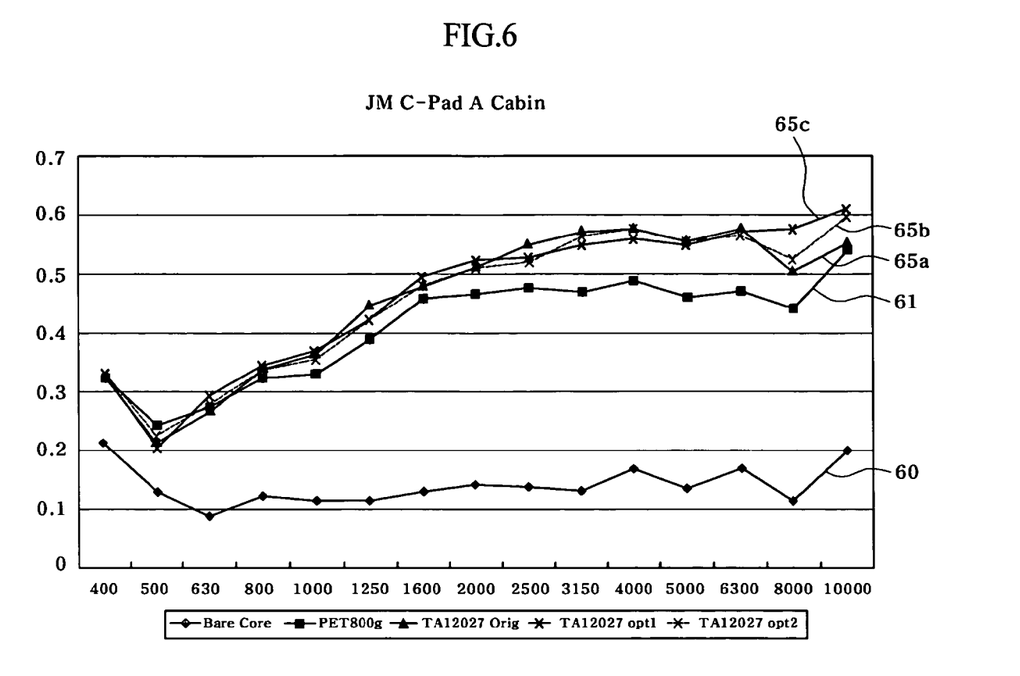
FIG. 6 is a graph illustrating noise absorbing performance according to noise absorbing panels of the noise absorbing structure of an instrument panel in accordance with the preferred embodiment of the present invention.

FIG. 1 is a perspective view illustrating a noise absorbing structure of an instrument panel according to a preferred embodiment of the present invention, FIG. 2 is a sectional view of the noise absorbing structure of an instrument panel taken along the line A-A' in FIG. 1, FIG. 3 is a sectional view of the noise absorbing structure of an instrument panel taken along the line B-B' in FIG. 1, FIG. 4 is a view illustrating ultrasonic welding points on the noise absorbing structure of an instrument panel according to the preferred embodiment of the present invention, FIG. 5 is a view illustrating a hot melt spraying line on the noise absorbing structure of an instrument panel according to the preferred embodiment of the present invention, and FIG. 6 is a graph illustrating noise absorbing performance according to noise absorbing panels of the noise absorbing structure of an instrument panel in accordance with the preferred embodiment of the present invention.

As shown in FIGS. 1 to 3, the noise absorbing structure of an instrument panel 10 according to the preferred embodiment of the present invention includes a first noise absorbing panel 20, provided in the instrument panel 10 that is disposed in front of the driver seat, for damping noise and vibration, a second noise absorbing panel 30, provided in the instrument panel 10 that is disposed in front of the front passenger seat, for damping noise and vibration, and a third noise absorbing panel 45, provided in the instrument panel 10 that is disposed in front of a moisture removing ventilation port 40 for discharging air so as to remove moisture from a vehicle front window, for damping noise and vibration.

Here, the first noise absorbing panel 20 damps vibration and noise generated by the instrument panel 10 in front of the driver seat, the second noise absorbing panel 30 damps vibration and noise generated by the instrument panel in front of the front passenger seat, and the third noise absorbing panel 45 damps vibration and noise generated by the instrument panel 10 where the moisture removing ventilation port 40 is disposed. The first, second, and third noise absorbing panels 20, 30, and 45 are attached to the lower surface of the instrument panel 10 such that they are not exposed to the instrument panel 10 and are attached to the instrument panel 10 before the assembly of the instrument panel 10.

Since the first, second, and third noise absorbing panels 20, 30, and 45 are attached to various positions of the upper side of the instrument panel 10, noise, by vibration of the upper side of the instrument panel 10 due to an engine, road conditions, and vehicle windows when traveling, is prevented. Particularly, the third noise absorbing panel 45 damps vibration and noise generated when air is discharged through the moisture removing ventilation port 40.

As shown in FIG. 4, the first noise absorbing panel 20, for example, is attached to the lower surface of the instrument panel 10 in a fashion that ultrasonic welding points 47 disposed at regular intervals are vibrated by an ultrasonic welding device. In other words, in the ultrasonic device, electric energy is converted into mechanical energy by a vibration wheel and is transmitted to the first noise absorbing panel 20, an object to be welded, through a hone. The first noise absorbing panel 20 and the instrument panel 10 are melted and welded to each other by instant frictional heat generated at welding surfaces thereof. The ultrasonic welding device is mainly used in welding plastics, bonding fabric films, welding metals, or the like. The first, second, and third noise absorbing panels 20, 30, and 45 are attached to the lower surface of the instrument panel 10 before the instrument panel 10 is installed in a vehicle.

The ultrasonic welding device melts and bonds different materials using friction, and is well suited to use as an attaching device for attaching the instrument panel 10 and the noise absorbing panels 20, 30, and 45, made of nonconductive materials such as plastic.

Moreover, as shown in FIG. 5, the first noise absorbing panel 20 is attached to the lower surface of the instrument panel 10 by a hot melt spraying device. Here, the hot melt spraying device attaches the first noise absorbing panel 20 to the instrument panel 10 by melting thermoplastic resins and coating the melted thermoplastic on the bonding surface 50 of the first noise absorbing panel 20.

The hot melt spraying device simply attaches the noise absorbing panels to the instrument panel 10 and can be applied to attach the noise absorbing panels 20, 30, and 45 to the instrument panel 10 of a vehicle that is already manufactured.

The graph shown in FIG. 6 illustrates noise and vibration absorbing performance measured in the vehicle in which the first, second, and third noise absorbing panels 20, 30, and 45 are attached to the instrument panel 10 during increasing RPM of the engine by pressing an accelerating pedal.

The horizontal axis of the graph represents the RPM change according to the pressed accelerating pedal, and the vertical axis thereof represents the noise and vibration absorbing performance of the first, second, and third noise absorbing panels 20, 30, ad 45.

A first line 60, depicted at the lowest position on the graph, represents the noise and vibration absorbing performance measured without any noise absorbing panel in the instrument panel 10, a second line 61, disposed above the first line 60, represents noise and vibration absorbing performance according to the RPM change measured when a non-woven fabric noise absorbing panel, which is obtained by making cotton, polyester segments, and fabric into a short fiber, by mixing and accumulating low melting point thermoplastic fabric, and by heating and cooling the mixed and accumulated thermoplastic fabric, is attached to the instrument panel 10.

Third, fourth, and sixth lines 65a, 65b, and 65c above the second line 61 represent the noise and vibration absorbing performance according to the RPM change measured when three non-woven fabric noise absorbing panels with slight difference are manufactured by fixing polypropylene microfiber to polyester fiber and is attached to the instrument panel 10.

As illustrated in the graph, when comparing the second, third, fourth, and fifth lines 61, 65a, 65b, and 65c representing the noise absorbing performance when the noise absorbing panel is attached to the instrument panel 10 with the first line 60 representing the noise absorbing performance when the noise absorbing panel 10 is not attached to the instrument panel 10, it can be seen that the noise absorption increases as the RPM increases when the noise absorbing panel is attached to the instrument panel 10, and that the noise absorption is substantially maintained without change as the RPM increases and a great deal of noise and vibration are generated in the vehicle when the noise absorbing panel is not attached to the instrument panel 10.

Moreover, the second, third, fourth, and fifth lines 61, 65a, 65b, and 65c represent the noise absorbing performance of the noise absorbing panel made of different materials, while, as shown in the graph, the noise absorbing performance represented by the third, fourth, and fifth lines 65a, 65b, and 65c gradually increase above that of the second line 61 when the RPM is above 500 RPM.

In other words, the non-woven fabric noise absorbing panel manufactured such that polypropylene micro-fabric is fixed to polyester fabric, as represented by the third, fourth, and fifth lines 65a, 65b, and 65c exhibit more excellent noise absorbing performance than the non-woven fabric noise absorbing panel that is obtained by making cotton, polyester segments, and fabric into a short fiber, mixing and accumulating thermoplastic fabric with low melting point, and heating and cooling the mixed and accumulated thermoplastic fabric, as represented by the second line 61.

Therefore, the most suitable material as a noise absorbing panel of an instrument panel is the non-woven fabric noise absorbing panel manufactured by fixing polypropylene micro-fabric to polyester fabric, which exhibits sufficient noise absorbing performance even when manufactured in small quantity in comparison with other noise absorbing panels, is easily attached to the instrument panel by the ultrasonic welding causing cost reduction, thin noise absorbing panel also exhibits high noise absorbing performance, and has excellent thermal efficiency.

As described above, the noise absorbing structure of an instrument panel according to the present invention prevents vibration generated by the engine from vibrating the instrument panel and damps noise generated from outside the vehicle transmitted to the interior of the vehicle.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A noise absorbing structure of an instrumental panel of a vehicle comprising:
    a first noise absorbing panel that damps noise and vibration, provided in a driver's side of the instrument panel;
    a second noise absorbing panel that damps noise and vibration, provided in a passenger side of the instrument panel; and
    a third noise absorbing panel that damps noise and vibration, provided in a front side of the instrument panel, that is disposed in front of a moisture removing ventilation port discharging air to remove moisture from a front window of the vehicle,
    wherein the noise absorbing panels comprise non-woven fabrics produced by fixing polypropylene micro fabric to polyester fabric.

2. The noise absorbing structure of an instrument panel of a vehicle as set forth in claim 1, wherein the noise absorbing panels are attached to a lower surface of the instrument panel by an ultrasonic welding device.

3. The noise absorbing structure of an instrument panel of a vehicle as set forth in claim 1, wherein the noise absorbing panels are attached to a lower surface of the instrument panel by a hot melt spraying device.

4. A noise absorbing structure of an instrumental panel of a vehicle comprising:
    a first noise absorbing panel that damps noise and vibration, provided in a driver's side of the instrument panel;
    a second noise absorbing panel that damps noise and vibration, provided in a passenger side of the instrument panel; and
    a third noise absorbing panel that damps noise and vibration, provided in a front side of the instrument panel, that is disposed in front of a moisture removing ventilation port discharging air to remove moisture from a front window of the vehicle,
    wherein the noise absorbing panels comprise non-woven fabrics that are obtained by making cotton, polyester segments, and fabric into short fibers, mixing and accumulating thermoplastic fabric in a low melting point, and heating and cooling the mixed and accumulated thermoplastic fabrics.

5. The noise absorbing structure of an instrument panel of a vehicle as set forth in claim 4, wherein the noise absorbing panels are attached to a lower surface of the instrument panel by an ultrasonic welding device.

6. The noise absorbing structure of an instrument panel of a vehicle as set forth in claim 4, wherein the noise absorbing panels are attached to a lower surface of the instrument panel by a hot melt spraying device.

7. A noise absorbing structure of an instrumental panel of a vehicle comprising:
    a first noise absorbing panel that damps noise and vibration, provided in a driver's side of the instrument panel;
    a second noise absorbing panel that damps noise and vibration, provided in a passenger side of the instrument panel; and
    a third noise absorbing panel that damps noise and vibration, provided in a front side of the instrument panel, that is disposed in front of a moisture removing ventilation port discharging air to remove moisture from a front window of the vehicle,
    wherein the third noise absorbing panel extends laterally in front of a portion of the first noise absorbing panel and in front of a portion of the second noise absorbing panel.

8. The noise absorbing structure of an instrument panel of a vehicle as set forth in claim 7, wherein the noise absorbing panels are attached to a lower surface of the instrument panel by an ultrasonic welding device.

9. The noise absorbing structure of an instrument panel of a vehicle as set forth in claim 7, wherein the noise absorbing panels are attached to a lower surface of the instrument panel by a hot melt spraying device.

10. The noise absorbing structure of an instrument panel of a vehicle as set forth in claim 1, wherein the third noise absorbing panel extends laterally in front of a portion of the first noise absorbing panel and in front of a portion of the second noise absorbing panel.

11. The noise absorbing structure of an instrument panel of a vehicle as set forth in claim 4, wherein the third noise absorbing panel extends laterally in front of a portion of the first noise absorbing panel and in front of a portion of the second noise absorbing panel.

* * * * *